US012474790B2

(12) United States Patent
Tetzner et al.

(10) Patent No.: US 12,474,790 B2
(45) Date of Patent: Nov. 18, 2025

(54) MOUSE DEVICE PROVIDED WITH MULTI-TOUCH REGION ON BUTTON

(71) Applicant: Voyetra Turtle Beach, Inc., San Diego, CA (US)

(72) Inventors: Thaddaeus Erasmus Georg Richard Tetzner, Hamburg (DE); Chih Wei Hung, New Taipei (TW); Yi-Chieh Lin, New Taipei (TW); Ying Chieh Hung, New Taipei (TW); Chieh Hua Yuan, New Taipei (TW)

(73) Assignee: Voyetra Turtle Beach, Inc., San Diego, CA (US)

( * ) Notice: Subject to any disclaimer, the term of this patent is extended or adjusted under 35 U.S.C. 154(b) by 0 days.

(21) Appl. No.: 18/725,421

(22) PCT Filed: Dec. 19, 2022

(86) PCT No.: PCT/US2022/081906
§ 371 (c)(1),
(2) Date: Jun. 28, 2024

(87) PCT Pub. No.: WO2023/129826
PCT Pub. Date: Jul. 6, 2023

(65) Prior Publication Data
US 2025/0110582 A1  Apr. 3, 2025

(30) Foreign Application Priority Data

Dec. 29, 2021 (TW) .................................. 110149334
Dec. 30, 2021 (CN) .......................... 202111643285.7

(51) Int. Cl.
*G06F 3/0354* (2013.01)
*G06F 3/038* (2013.01)

(52) U.S. Cl.
CPC ........ *G06F 3/03543* (2013.01); *G06F 3/0383* (2013.01)

(58) Field of Classification Search
CPC ............ G06F 3/03543; G06F 3/03547; G06F 3/0383; G06F 3/03549; G06F 3/041; G06F 3/033
USPC ................................................ 345/163, 153
See application file for complete search history.

(56) References Cited

U.S. PATENT DOCUMENTS

| 2001/0015718 | A1* | 8/2001 | Hinckley | ............ | G06F 3/03547 345/156 |
| 2006/0274042 | A1* | 12/2006 | Krah | .................. | G06F 3/03543 345/163 |
| 2007/0152966 | A1 | 7/2007 | Krah et al. | | |

(Continued)

*Primary Examiner* — Koosha Sharifi-Tafreshi
(74) *Attorney, Agent, or Firm* — Sheppard Mullin Richter & Hampton LLP

(57) ABSTRACT

A mouse device includes a multi-touch region on a button. The mouse device includes a touchpad, a press switch, a button cover and a control board. The touchpad triggers a corresponding touch signal when any one of a plurality of touch regions respectively corresponding to a plurality of input events is pressed. A switch signal is triggered when the press switch is pressed. The button cover is used to accept a pressing operation of pressing toward an inner side to press the touchpad, and to press the press switch through the touchpad. When receiving the touch signal and the switch signal, the control board triggers the input event of the pressed touch region.

10 Claims, 7 Drawing Sheets

(56) References Cited

U.S. PATENT DOCUMENTS

| | | | |
|---|---|---|---|
| 2007/0229472 A1* | 10/2007 | Bytheway | G06F 3/04847 345/173 |
| 2010/0242274 A1 | 9/2010 | Rosenfeld | |
| 2010/0245246 A1* | 9/2010 | Rosenfeld | G06F 3/0383 345/163 |
| 2013/0120259 A1 | 5/2013 | Piot et al. | |
| 2013/0127719 A1 | 5/2013 | Yasutake | |
| 2013/0169424 A1* | 7/2013 | Kujawski | G06F 3/0485 340/407.2 |
| 2014/0022173 A1 | 1/2014 | Ma | |
| 2017/0212628 A1 | 7/2017 | Lee | |
| 2019/0302899 A1* | 10/2019 | Lin | G06F 3/0383 |

\* cited by examiner

MOUSE DEVICE PROVIDED WITH MULTI-TOUCH REGION ON BUTTON

CROSS-REFERENCE TO RELATED APPLICATIONS

This application is a National Phase application under 35 U.S.C. § 371 of PCT Application No. PCT/US2022/081906, filed Dec. 19, 2022, which application claims the benefit of Taiwan Patent Application No. 110149334, filed Dec. 29, 2021, and Chinese Patent Application No. 202111643285.7, filed Dec. 30, 2021, which are hereby incorporated herein by reference in their entirety.

TECHNICAL FIELD

The present invention relates to a mouse device, and more particularly, to a mouse device provided with a multi-touch region on a button.

BACKGROUND ART

The existing mechanical mice trigger input events through mechanical switches, that is, the number of mechanical switches is equal to the number of input events that can be triggered.

The click operation of the aforementioned mechanical switches has a sense of feedback (such as a fragmented falling sense of being pressed and bounced back), which allows users to clearly determine whether the click operation is completed.

In order to trigger a larger number of input events, the mechanical mouse must be provided with a larger number of mechanical switches.

The above situation greatly increases the manufacturing cost of the mechanical mouse. Moreover, when there are too many mechanical switches, it is easy for the users to touch unexpected buttons by mistake, resulting in a poor experience.

At present, another kind of touch mouse has been proposed. The aforementioned touch mouse uses a touchpad to replace the mouse button, and the users can make different gestures (such as single click, continuous click, one-finger swipe, multi-finger swipe, etc.) on the touchpad to trigger different kinds of input events.

However, the touch mouse triggers an input event through a change in resistance or capacitance, and cannot generate a sense of feedback like a mechanical switch, which makes it impossible for the users to determine whether the click operation is completed when performing a click operation on the existing touch mouse, resulting in a poor experience.

Moreover, compared with directly clicking on the mechanical switch, inputting gestures is too time-consuming, which makes the touch mouse unsuitable for applications such as e-sports, document editing, and image retouching that need to quickly trigger input events.

Therefore, the existing mouse devices have the above-mentioned problems, and more effective solutions are urgently needed.

SUMMARY OF THE INVENTION

A main objective of the present invention is to provide a mouse event, which can trigger different mouse events by using different regions of the same button.

In an embodiment, a mouse device provided with a multi-touch region on a button comprises a touchpad, a press switch, a button cover, and a control board. The touchpad is used to, when any one of a plurality of touch regions is pressed, trigger a touch signal corresponding to the pressed touch region, wherein the plurality of touch regions correspond to a plurality of input events, respectively. The press switch is disposed on an inner side of the touchpad, and is used to trigger a switch signal when being pressed. The button cover is disposed on an outer side of the touchpad, and is used to accept a pressing operation of pressing toward the inner side to press the touchpad, and to press the press switch through the touchpad. The control board is electrically connected to the touchpad and the press switch, and triggers the input event of the pressed touch region when receiving the touch signal and the switch signal.

In an embodiment, the plurality of touch regions comprises a first touch region corresponding to a mouse event and a second touch region corresponding to a first button combination event.

In an embodiment, the plurality of touch regions comprises a third touch region corresponding to a second button combination event.

In an embodiment, the first touch region is a right mouse button region or a left mouse button region, and the mouse event is a right button event or a left button event.

In an embodiment, the mouse device further comprises a touch circuit electrically connected to the touchpad and the control board and used to sense pressing on the plurality of touch regions and to send the touch signal to the control board.

In an embodiment, the mouse device further comprises a side touchpad electrically connected to the control board and used to, when any one of a plurality of side touch regions is pressed, trigger a side touch signal of the pressed side touch region, wherein the plurality of side touch regions correspond to the plurality of input events, respectively, and the control board is set to trigger the input event of the pressed side touch region when receiving the side touch signal.

In an embodiment, the control board further comprises a control firmware, wherein the control firmware is used to, after being executed, control the control board to identify the touch region corresponding to the received touch signal, and trigger the input event of the touch region.

In an embodiment, the plurality of touch regions are adjustable, and the control firmware is used to define a range of the plurality of touch regions.

In an embodiment, the control firmware is used to define boundaries of the plurality of touch regions.

In an embodiment, the mouse device further comprises an application program used to be installed on a computer device connected to the mouse device, wherein the application program is used to, after being executed, display an operation interface through the computer device, accept a region adjustment operation for adjusting a range of the plurality of touch regions through the operation interface, and set a control firmware on the basis of the plurality of adjusted touch regions; the application program is used to, accept an input setting operation for setting the plurality of input events corresponding to the plurality of touch regions through the operation interface, and set a control firmware on the basis of the plurality of adjusted touch regions; and the application program is used to transmit the control firmware to the mouse device through the computer device.

In the present invention, the number of input events capable of being triggered quickly can be increased, and touch clicks with a sense of feedback can be provided, so that the user experience can be improved.

IN THE FIGURES

1: mouse device; 10: control board; 11: touchpad; 12: press switch; 2: mouse device; 20: control board; 21: touchpad; 22: side touchpad; 23: touch circuit; 24: press switch; 25: side press switch; 26: pointing module; 27: scroll wheel sensor; 28: communication interface; 29: indication interface; 3: computer device; 40: control firmware; 41: application program; 5: mouse device; 50: housing; 500: left button cover; 501: scroll wheel; 502: right button cover; 503: first side button; 504: second side button; 505: side cover; 510: left touchpad; 511: right touchpad; 520: side touchpad; 521: side support plate; 530: left press switch; 531: right press switch; 532: left press plate; 533: right press plate; 54: touch circuit; 55: control board; 56: base; 570: scroll wheel sensor; 571: middle press switch; R11, R12, R13, R21, R22, R23, R31, R32, R33: touch region.

DETAILED DESCRIPTION OF PREFERRED EMBODIMENTS

The present invention will be further described below in conjunction with accompanying drawing and specific embodiments, so that the present invention can better understood and can be implemented by a person skilled in the art, but the embodiments given are not intended to limit the present invention.

The present invention mainly proposes a mouse device provided with a multi-touch region on a button, and the button of the mouse device is provided with a touchpad. A user can trigger different input events by pressing different positions (i.e., different touch regions) of the same button.

Thereby, the present invention may enable different regions of a single button to be used to trigger different input events.

Figure 1:
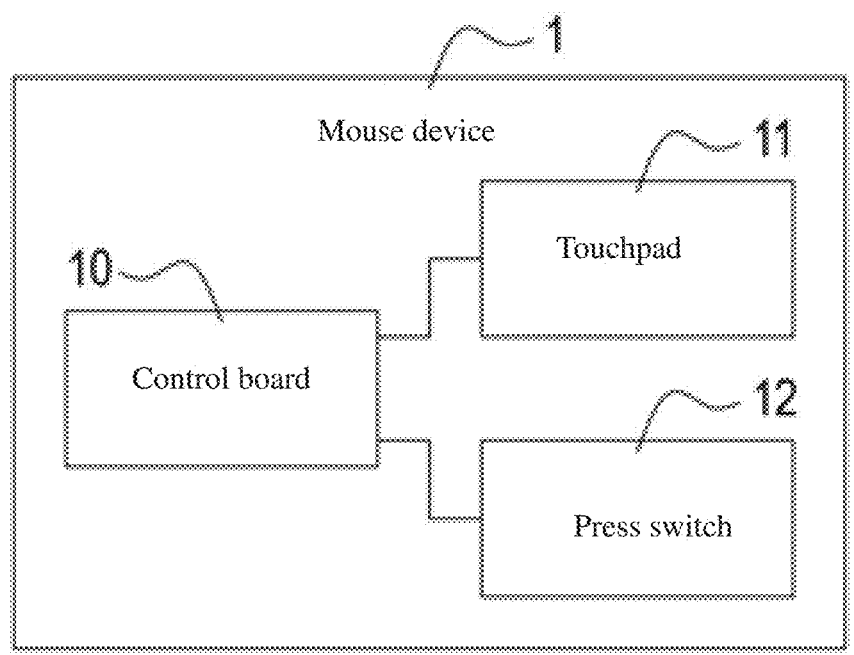
FIG. 1 is an architecture diagram of a mouse device according to an embodiment of the present invention.

Please refer to FIG. 1, which is an architecture diagram of a mouse device according to an embodiment of the present invention.

In this embodiment, the mouse device 1 may include a touchpad 11, a press switch 12, and a control board 10 electrically connected to the above elements.

The touchpad 11 is defined with a plurality of touch regions, and is used to, when any one of the plurality of touch regions is pressed, trigger a touch signal corresponding to the pressed touch region.

The touchpad 11 may be, for example, a capacitive touchpad, a resistive touchpad, or other thin-film touchpads, and it is not limited thereto.

In an embodiment, the touch signal can be used to locate a pressed position in the touchpad 11, so that the control board 10 can know the touch region pressed by the user.

In an embodiment, a plurality of touch regions can be defined to correspond to a plurality of input events, respectively. The input event may be, for example, a single button event such as a left button event, a middle button event, a right button event, a button "E" event, a button "S" event, etc., or a button combination event such as a combination of a left button event and a middle button event, a combination of a left button event and a button "e" event, and a combination of a button "ctrl" event and a button "c" event, etc.

The press switch 12 (e.g., a micro switch) can be disposed on an inner side of the touchpad 11, so that the user can push the touchpad 11 toward the inside to press the press switch 12 after pressing the touchpad 11. The press switch 12 is used to trigger a switch signal when it is pressed.

In an embodiment, the aforementioned switch signal and the aforementioned touch signal may be binary signals (e.g., only two states of on and off).

The control board 10 is used to control the mouse device 1 to trigger a corresponding input event on the basis of the user's pressing operation.

In an embodiment, when the control board 10 receives the touch signal and the switch signal located on the same button, it can identify the pressed touch region and trigger an input event corresponding to the touch region.

In an embodiment, the plurality of touch regions can be connected to the control board 10 through different lines, so that the control board 10 can identify the pressed touch region on the basis of a line on which the touch signal is received.

In an embodiment, the touchpad 11 may include a plurality of sensing points, and the plurality of sensing points may be dynamically allocated to a plurality of touch regions.

For example, the touchpad 11 includes 30 sensing points. In a first setting, 1st to 15th sensing points may be allocated to a first touch region, and 16th to 30th sensing points may be allocated to a second touch region. In a second setting, 1st to 10th sensing points may be allocated to the first touch region, and 11th to 30th sensing points may be allocated to the second touch region. In a third setting, 1st to 10th sensing points may be allocated to the first touch region, 11th to 20th sensing points may be allocated to the second touch region, and 21st to 30th sensing points may be allocated to the third touch region.

Figure 10:
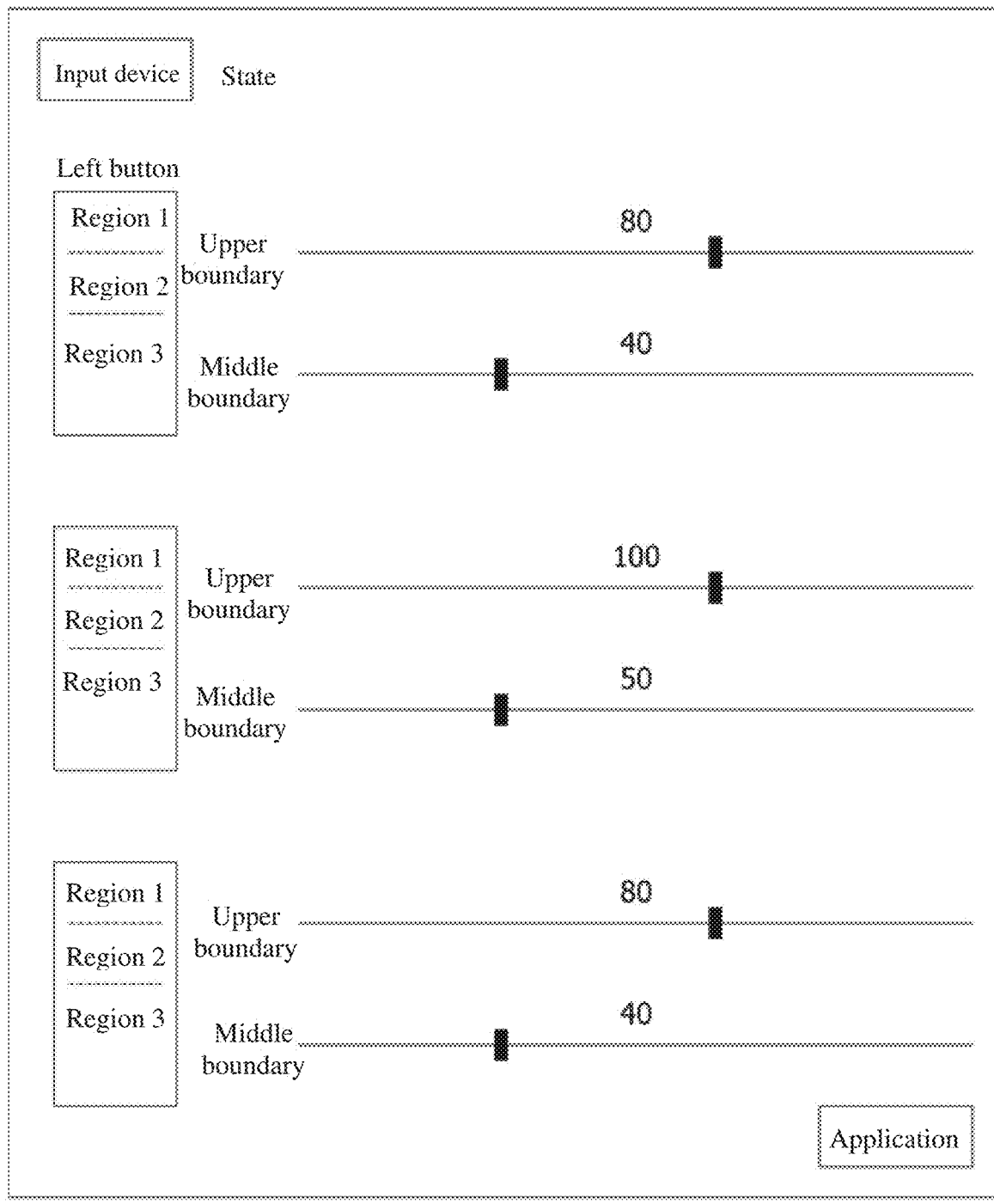
FIG. 10 is a schematic structural diagram of an operation interface of an application program according to an embodiment of the present invention.

Thereby, when any sensing point is triggered, the control board 11 can quickly identify the pressed touch region on the basis of the set allocation relationship (for example, a setting method similar to FIG. 10 is used).

In an embodiment, when the control board 10 only receives the touch signal, but does not receive the switch signal of the same button, it can be determined that the touch signal is a false touch, and the touch signal is filtered out.

Thereby, the user must press the touchpad 11 until the press switch 12 is triggered to trigger the corresponding input event. The above-mentioned operation may enable the user to obtain the sense of feedback from the mechanical switch when pressing the touchpad 11, and thus clearly determine whether the click is completed.

In an embodiment, when the control board 10 receives the switch signal and the touch signal of the same button, a time difference between the time when the switch signal is triggered and the time when the touch signal is triggered can be calculated, and when the time difference is less than a preset value (e.g., 0.1 seconds, 0.05 seconds, 0.5 seconds, etc.), the input event corresponding to the corresponding touch region is triggered.

Figure 3:
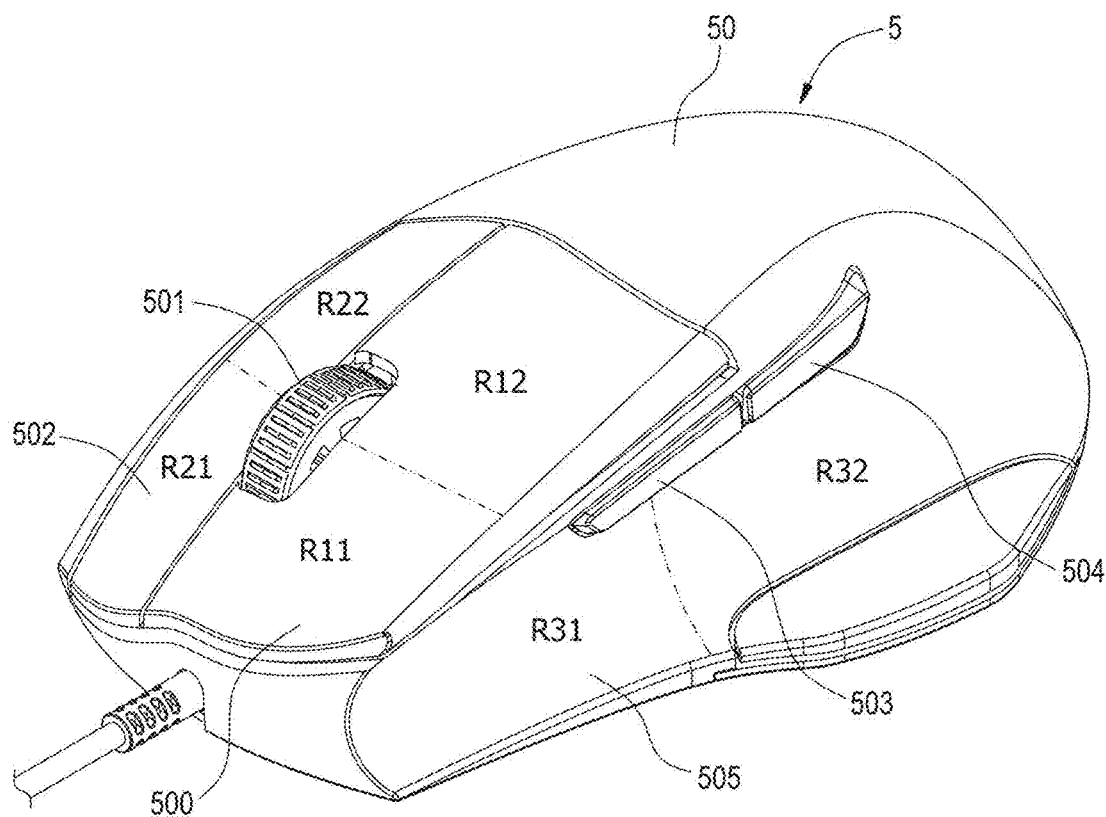
FIG. 3 is a schematic diagram of the appearance of a mouse device according to an embodiment of the present invention.

Please refer to FIG. 3, which is a schematic diagram of the appearance of a mouse device according to an embodiment of the present invention.

In this embodiment, the mouse device 5 includes a housing 50.

The housing 50 includes button covers (a left button cover 500 and a right button cover 502), a scroll wheel 501, side buttons (a first side button 503 and a second side button 504) and a side cover 505.

The aforementioned control board, the press switch and the touchpad are all disposed in the housing 50.

In an embodiment, the mouse device 5 has a plurality of touchpads, such as a left touchpad, a right touchpad and a side touchpad.

The left touchpad corresponds to a left mouse button, and can be divided into a touch region R11 and a touch region R12, that is, different regions of the left mouse button can be used to trigger two input events, respectively.

The right touchpad corresponds to a right mouse button, and can be divided into a touch region R21 and a touch region R22, that is, different regions of the right mouse button can be used to trigger two input events, respectively.

The side touchpad can be divided into a side touch region R31 and a side touch region R32, that is, different regions of a mouse side plate can be used for two input events, respectively.

In an embodiment, a first touch region of the plurality of touch regions of the same button can be corresponding to a mouse event, and a second touch region can be corresponding to a button combination event (a first button combination event).

For example, the touch region R11 and the touch region R21 can be corresponding to the left button event and the right button event, respectively. The touch region R12 can be corresponding to the button combination event of the left button event and the button "e" event, and the touch region R22 can be corresponding to the button combination event of the right button event and the button "e" event.

In another example, the touch region R12 and the touch region R22 can be corresponding to the left button event and the right button event, respectively, and the touch region R11 and the touch region R22 can be corresponding to different button combination events.

Figure 2:
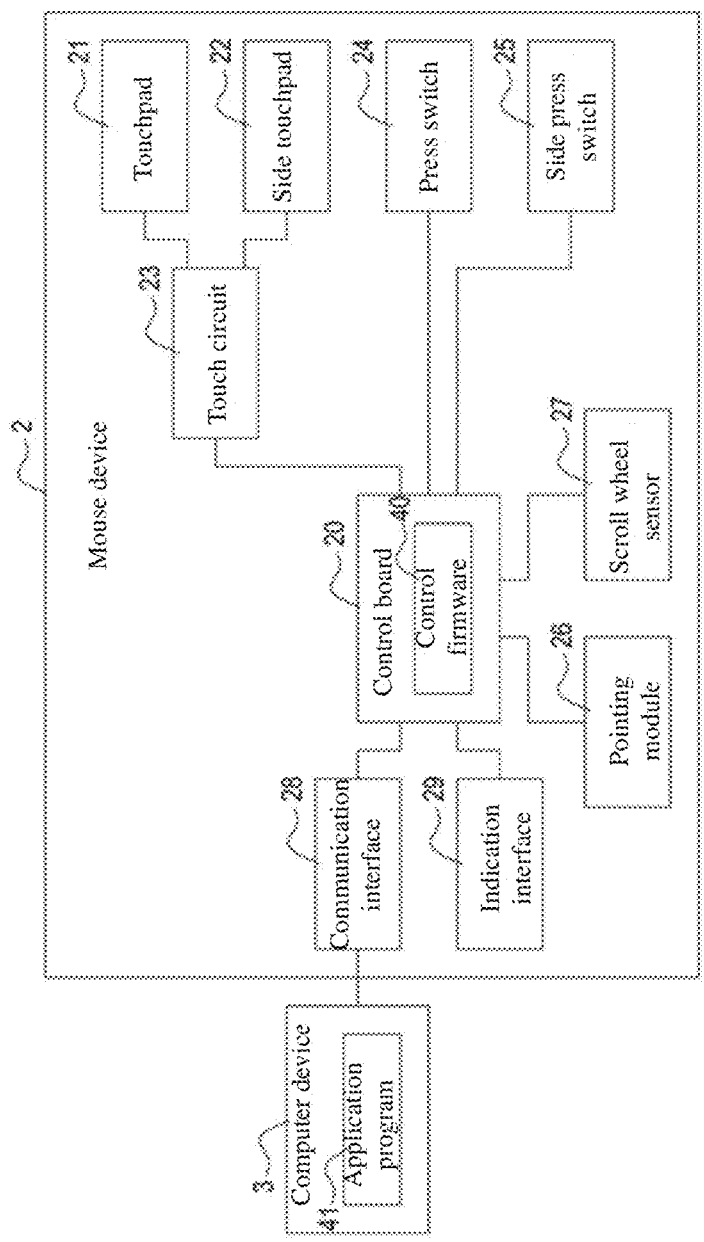
FIG. 2 is an architecture diagram of a mouse device according to an embodiment of the present invention.

Please refer to FIG. 2, which is an architecture diagram of a mouse device according to an embodiment of the present invention.

In this embodiment, the mouse device 2 may include a touchpad 21, a side touchpad 22, a touch circuit 23, a press switch 24, a side press switch 25, a pointing module 26, a scroll wheel sensor 27, a communication interface 28, an indication interface 29, and a control board 20 electrically connected to the above-mentioned elements.

In an embodiment, the touchpad 21 and the side touchpad 22 are connected to the touch circuit 23, and are connected to the control board 20 through the touch circuit 23.

Specifically, when the touchpad 21 and the side touchpad 22 are pressed, the touch circuit 23 can locate a pressed touch position (such as the aforementioned sensing point), and trigger the touch signal corresponding to the touch position to the control board 20, so that the control board 20 quickly identifies the pressed touch region on the basis of the set allocation relationship.

In an embodiment, the touch circuit 23 can sense the pressing of the plurality of touch regions (comprising the touch regions R11-R22 and the side touch regions R31-R32), and send corresponding touch signals to the control board 20.

In an embodiment, the touch circuit 23 can perform signal processing (such as noise filtering processing, enhancement processing, false touch detection, etc.) on the touch signal, and transmit the processed touch signal to the control board 20.

In an embodiment, the side touchpad 22 is provided with a plurality of side touch regions, and when any one of the plurality of side touch regions is pressed, it can trigger a side touch signal of the pressed side touch region. The plurality of aforementioned side touch regions correspond to a plurality of input events, respectively, and their corresponding relationship can be set by the user as needed.

Moreover, the control board 20 is set to trigger an input event corresponding to the pressed side touch region when receiving the aforementioned side touch signal.

When the press switch 24 (such as micro switches disposed on the left mouse button, the right mouse button and the middle mouse button) and the side press switch 25 (such as a micro switch disposed on the side button) are pressed, corresponding switch signals are triggered to the control board 20.

The pointing module 26 (such as a trackball sensor, an optical displacement sensor or other pointing sensors) is used to sense the user's moving mouse operation, and trigger a corresponding moving mouse signal to move a position of a mouse pointer in a computer device 3.

The scroll wheel sensor 27 is used to sense the user's scroll wheel operation, and trigger a corresponding scroll wheel mouse signal (scroll speed and scroll direction).

The communication interface 28 may be a wireless or wired interface, such as a Bluetooth interface or a USB interface. The communication interface 28 is used to connect the computer device 3 to transmit input events to the computer device 3 for execution, or to receive updates of the control firmware 40 from the computer device 3.

The indication interface 29 (such as an LED indicator light) is used to indicate a state of the mouse device 2, such as a power state, a connection state, a working mode, etc.

The control board 20 is used to control the mouse device 2. In an embodiment, the control board 20 controls each element of the mouse device 2 through executing the control firmware 40.

In an embodiment, after a controller (not shown) of the control board 20 executes the control firmware 40, it can detect the triggering of the switch signal and the touch signal, and can identify the touch region corresponding to the received touch signal, and trigger the input event of this touch region.

In an embodiment, the mouse device 2 includes an application program 41. The application program 41 is used to be installed on the computer device 3 (e.g., a notebook computer, a desktop computer, a tablet computer, etc.) connected to the mouse device 2.

After the application program 41 is executed by the computer device 3, the application program 41 can display an operation interface (e.g., a graphical user interface) by means of a display of the computer device 3. The aforementioned operation interface can be used to perform various settings of the mouse device 2.

In an embodiment, the operation interface can be used to set the range of each touch region and the corresponding input event.

Please refer to FIGS. 2 and 10 together, wherein FIG. 10 is a schematic structural diagram of an operation interface of an application program according to an embodiment of the present invention.

In this embodiment, each touchpad is divided into three touch regions as an example.

In an embodiment, the control firmware 40 is defined with the range of each touch region, so that the clicked touch region can be identified according to the pressed touch position.

In an embodiment, the control firmware 40 is defined with boundaries of a plurality of touch regions, so as to define the range of each touch region through the boundaries.

In an embodiment, the range of each touch region can be adjusted in the computer device 3 through the application program 41.

In an embodiment, after the application program 41 is executed by the computer device 3, it can display the operation interface as shown in FIG. 10 through the computer device 3, accept a region adjustment operation for adjusting the range of the plurality of touch regions from the user through the operation interface, set a new control firmware 40 on the basis of the plurality of adjusted touch regions, and transmit the new control firmware 40 to the mouse device 2 through the computer device 3 for execution.

In an embodiment, the application program 41 may accept an input setting operation for setting the plurality of input events corresponding to the plurality of touch regions through the operation interface, set a new control firmware on the basis of the plurality of adjusted input events, and transmit the new control firmware 40 to the mouse device 2 through the computer device 3 for execution.

In an embodiment, the aforementioned operation interface can display the state of the input device (i.e., the connected mouse device 2), the separation boundaries (upper boundary and middle boundary) of the three touch regions of the left button, the separation boundaries (upper boundary and middle boundary) of the three touch regions of the right button, and the separation boundaries (upper boundary and middle boundary) of the three touch regions of the side button.

In addition, the user can manually adjust the positions of the upper boundary and the middle boundary of the three touch regions of each button according to the usage habits, so as to adjust the touch regions to a size which he is used to.

In an embodiment, after the control firmware 40 corresponding to the above settings is installed, the control board 20 can reallocate the touch regions to which the plurality of touch positions belong on the basis of the set boundaries of the touch regions, thereby adjusting the range and size of the touch regions.

Figure 4:
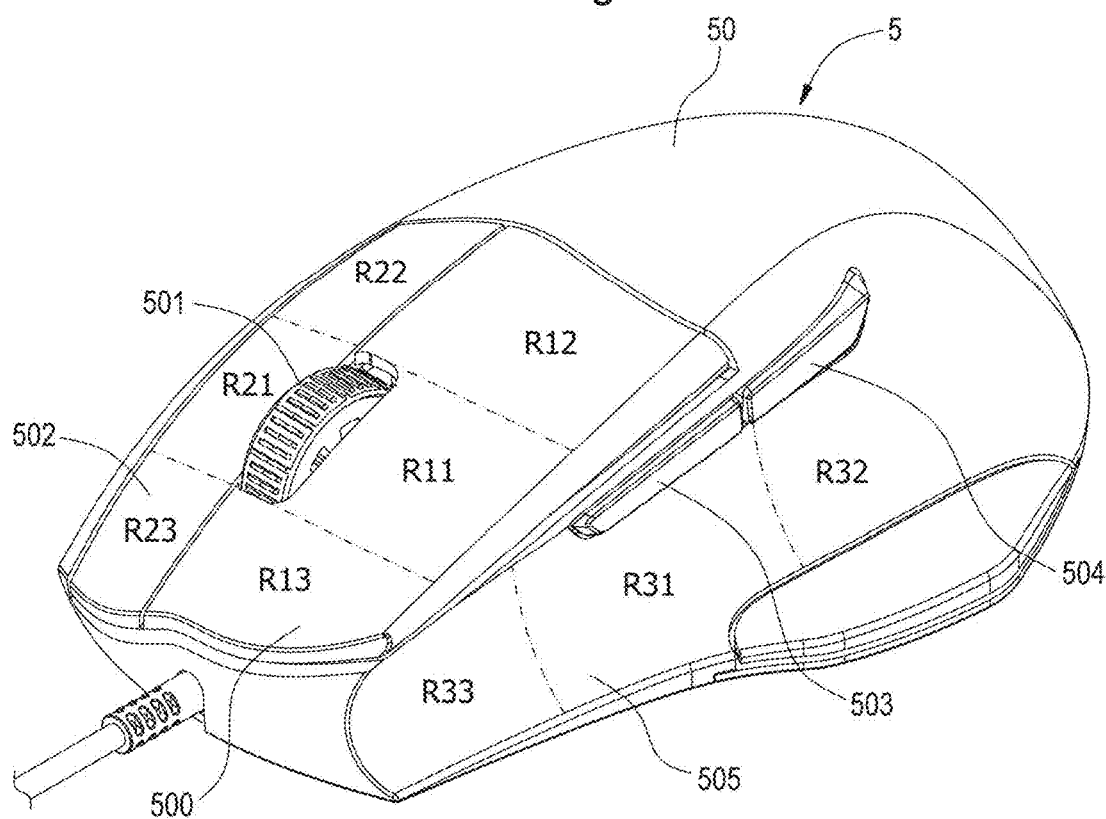
FIG. 4 is a schematic diagram of the appearance of a mouse device according to an embodiment of the present invention.

Please refer to FIGS. 3 and 4, wherein FIG. 4 is a schematic diagram of the appearance of a mouse device according to an embodiment of the present invention.

In this embodiment, each touchpad is divided into three touch regions.

The left touchpad is located in the left mouse button region, is divided into touch regions R11-R13, and is used to trigger three input events.

The right touchpad is located in the right mouse button region, is divided into touch regions R21-R23, and is used to trigger three input events.

The side touchpad is located in the side mouse region, is divided into side touch regions R31-R33, and is used to trigger three input events.

In an embodiment, the first touch region of the plurality of touch regions of the same button can be corresponding to a mouse event (such as a left button event, a right button event or a middle button event), the second touch region can be corresponding to a button combination event (a first button combination event), and the third touch region can be corresponding to a button combination event (a second button combination event), but it is not limited thereto. The user can arbitrarily change the above corresponding relationship as needed.

Figure 5:
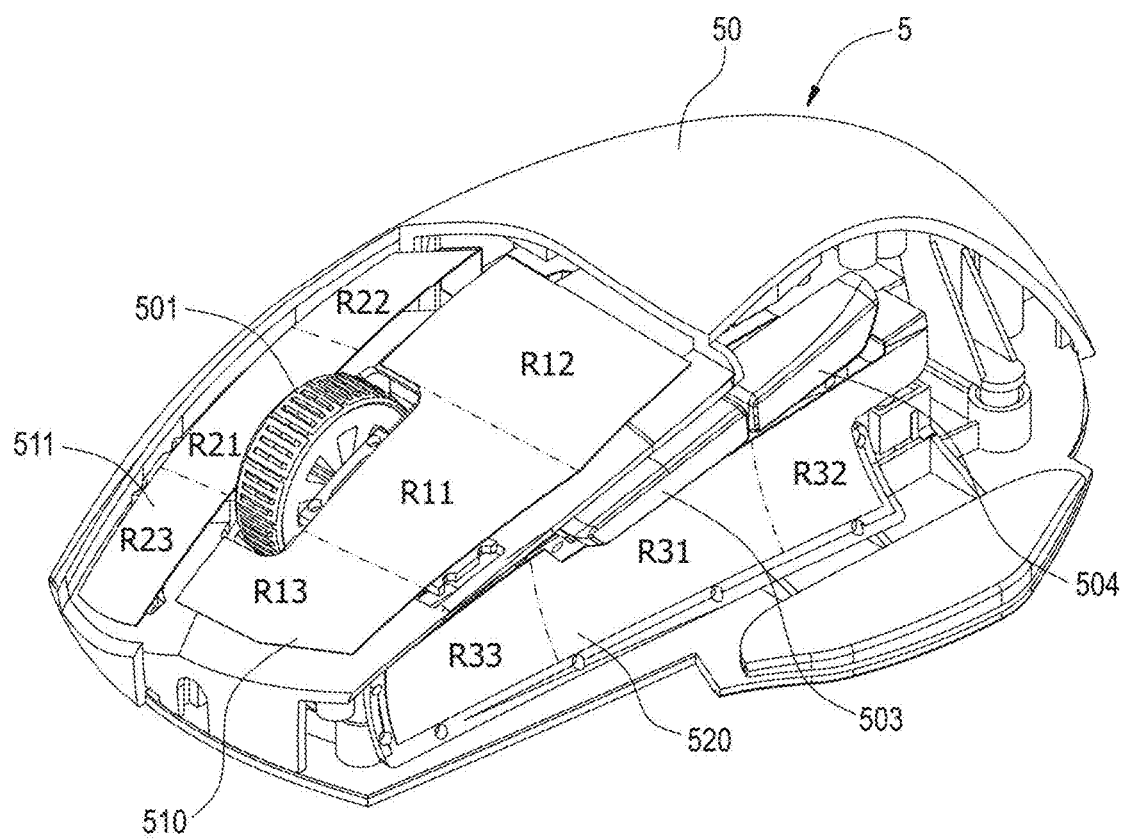
FIG. 5 is a schematic structural diagram of a mouse device according to an embodiment of the present invention.
Figure 6:
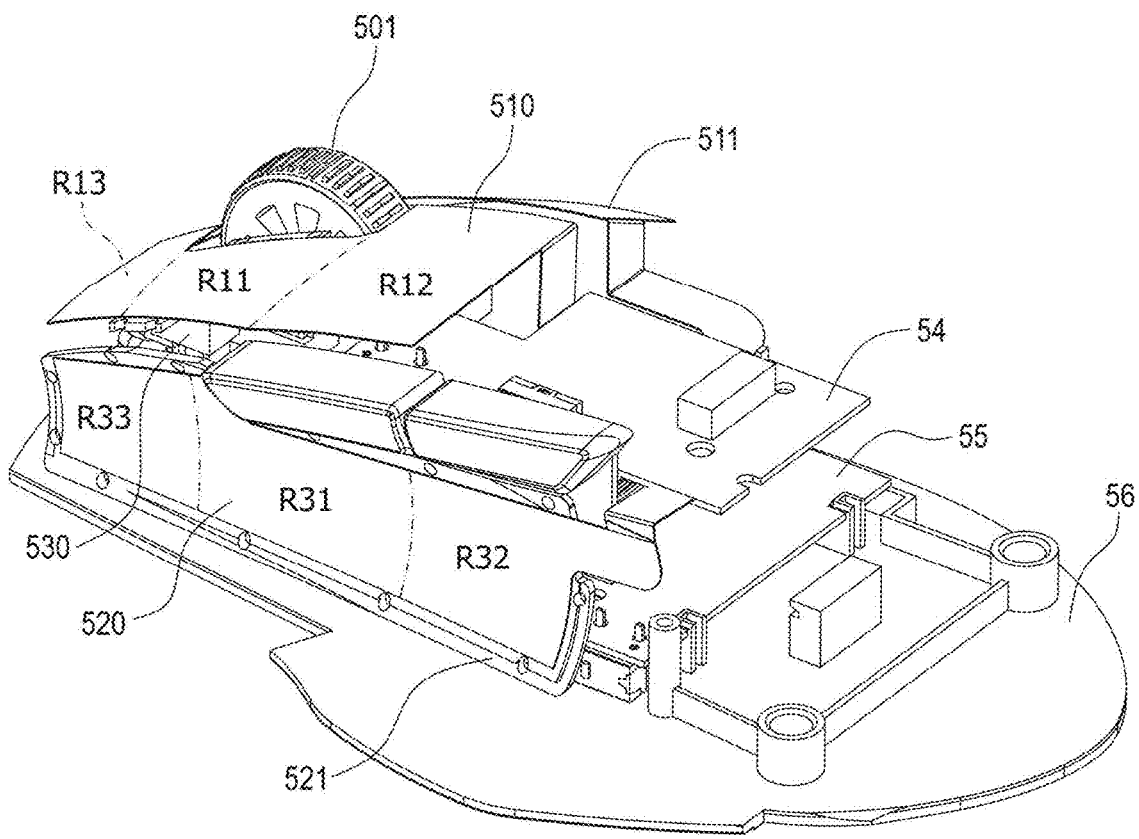
FIG. 6 is a schematic structural diagram of a mouse device according to an embodiment of the present invention.
Figure 7:
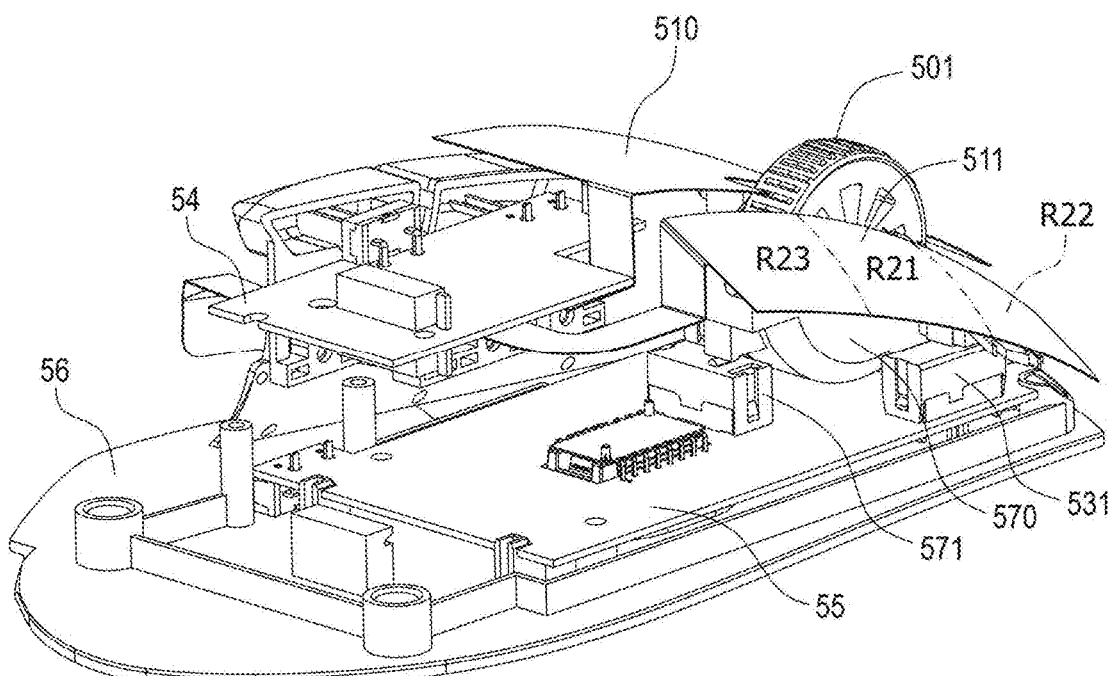
FIG. 7 is a schematic structural diagram of a mouse device according to an embodiment of the present invention.
Figure 8:
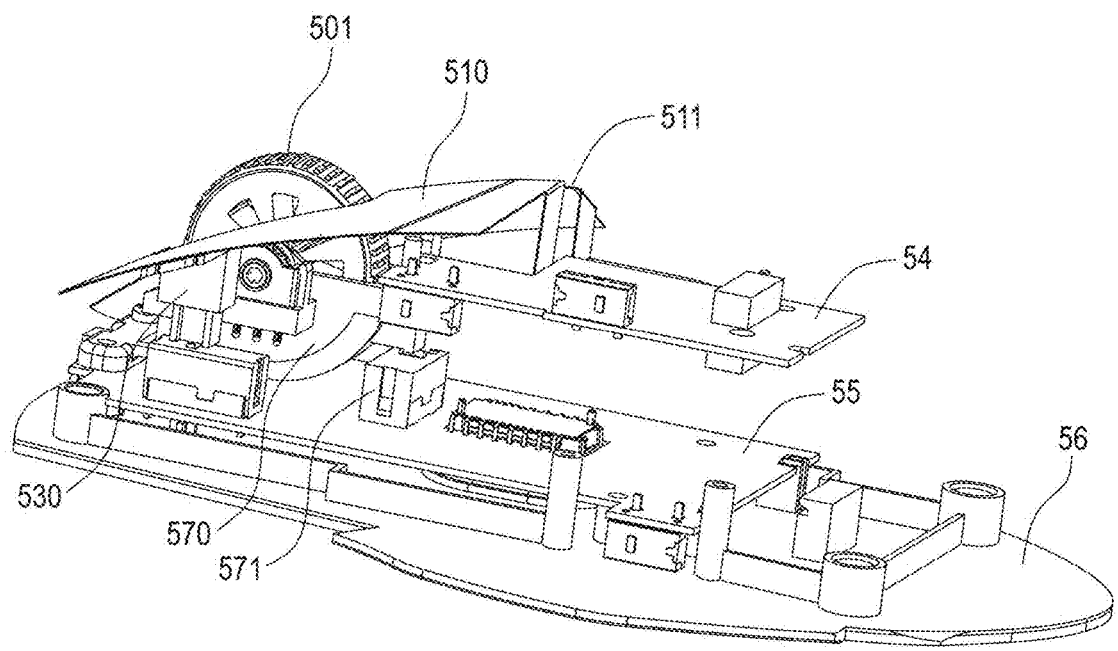
FIG. 8 is a schematic structural diagram of a mouse device according to an embodiment of the present invention.
Figure 9:
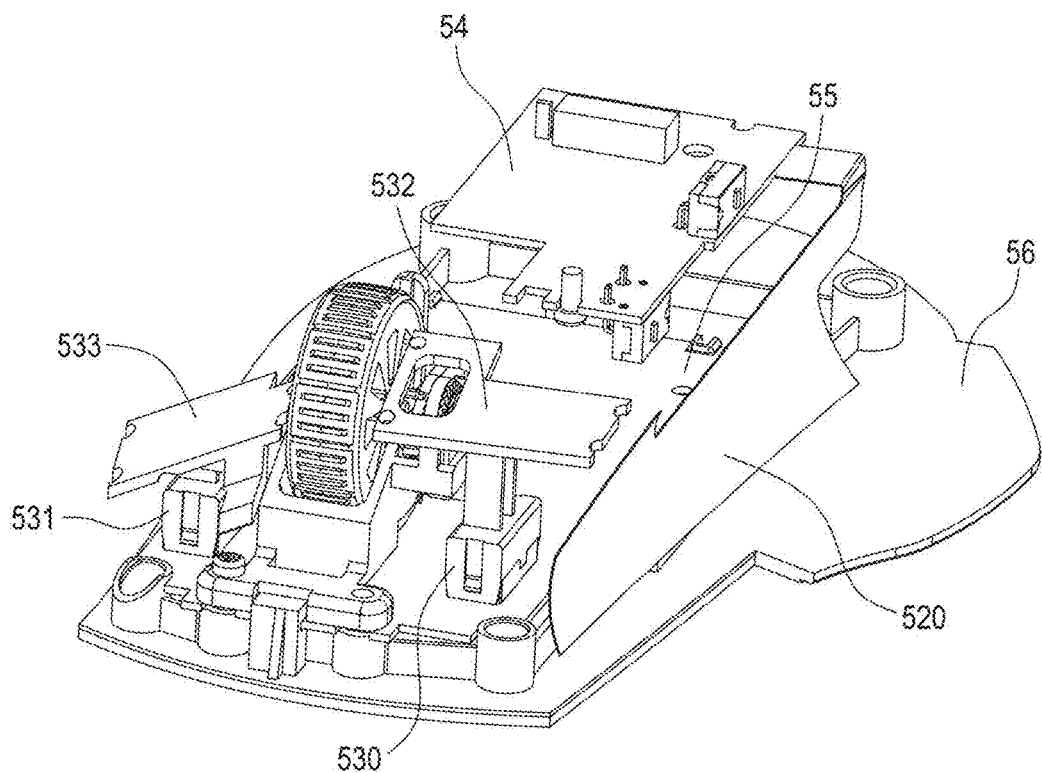
FIG. 9 is a schematic structural diagram of a mouse device according to an embodiment of the present invention.

Please refer to FIGS. 4 to 9 together. FIG. 5 is a schematic structural diagram of a mouse device according to an embodiment of the present invention. FIG. 6 is a schematic structural diagram of a mouse device according to an embodiment of the present invention. FIG. 7 is a schematic structural diagram of a mouse device according to an embodiment of the present invention. FIG. 8 is a schematic structural diagram of a mouse device according to an embodiment of the present invention. FIG. 9 is a schematic structural diagram of a mouse device according to an embodiment of the present invention.

In an embodiment, the button cover is disposed on an outer side of the touchpad, and is used to accept the pressing operation of pressing toward the inner side to press the touchpad, and to press the press switch through the touchpad.

For example, when the user presses a front end of a left button cover 500, the front end of the left button cover 500 will press a touch region R13 at a front end of a left touchpad 510 toward the inner side, so as to trigger a touch signal. Next, the front end of the left button cover 500 continues to press the touch region R13, and the touch region R13 presses a left press plate 532 to press a left press switch 530 below, so as to trigger the switch signal. The same principle also applies to middle and rear ends of the left button cover 500, and will not be repeated here.

In another example, when the user presses a middle end of a right button cover 502, the middle end of the right button cover 502 will press a touch region R21 at a middle end of a right touchpad 511 toward the inner side, so as to trigger a touch signal. Next, the middle end of the right button cover 502 continues to press the touch region R21, and the touch region R21 presses a right press plate 533 to press a right press switch 531 below, so as to trigger a switch signal. The same principle also applies to front and rear ends of the right button cover 502, and will not be repeated here.

In another example, when the user clicks an end of a side cover 505, the end of the side cover 505 will press a touch region R33 at an end of a side touchpad 520, so as to trigger a touch signal. The same principle also applies to front and middle ends of the side cover 505, and will not be repeated here.

In an embodiment, a press switch and a switch structure can be disposed on the inner side of the side touchpad 520, so that the user can obtain a sense of feedback when pressing the side touchpad 520.

In an embodiment, the inner side of the side touchpad 520 may not be provided with a press switch and a switch structure, so that the user does not obtain a sense of feedback when pressing the side touchpad 520.

In an embodiment, when the inner side of the side touchpad 520 is not provided with a press switch and a switch structure, the inner side of the side touchpad 520 may be provided with a side support plate 521. The side support plate 521 is used to support the side touchpad 520 in the form of a thin film, so as to prevent the side touchpad 520 from being deformed or damaged due to the user's pressing.

In an embodiment, the left touchpad 510, the right touchpad 511 and the side touchpad 520 can be connected to a touch circuit 54 and connected to a control board 55 through the touch circuit 54.

In an embodiment, the mouse device 5 may include any combination of the left touchpad 510, the right touchpad 511 and the side touchpad 520.

For example, the mouse device 5 may include the left touchpad 510 and the right touchpad 511, but not the side touchpad 520.

For example, the mouse device 5 may include the side touchpad 520, but not the left touchpad 510 and the right touchpad 511.

In an embodiment, the control board 55 is disposed on a base 56, and the touch circuit 54 is disposed above the control board 55. Thereby, the wiring length from the touchpad to the touch circuit 54 can be reduced, and the wiring of the mouse device 5 can be simplified.

In an embodiment, a scroll wheel sensor 570 is disposed below a scroll wheel 501.

In an embodiment, a middle press switch 571 corresponding to a middle button is provided below the scroll wheel 501. When the user presses the scroll wheel 501 to cause the middle press switch 571 to trigger a switch signal, an input event of the middle button can be triggered.

It is worth mentioning that the existing touch mouse senses the user's touch gestures, and thus a high-resolution touchpad and a controller with high processing performance are required.

Since the mouse device of the present invention only needs to sense whether the touchpad is pressed by the touch, and does not need to sense the touch gestures of the user, it can greatly reduce the amount of computation, and can thus use a low-resolution touchpad and a controller with low processing performance.

It is worth mentioning that, although a single touchpad is divided into two touch regions or three touch regions in the aforementioned embodiments, it should not be limited thereto.

In an embodiment, the number of touch regions of each touchpad can be planned and designed by the user as needed. Moreover, changing the number and range of the touch regions can be quickly implemented by means of updating the control firmware 40 without redesigning the hardware.

The embodiments described above are only preferred embodiments for sufficiently explaining the present invention, and the scope of protection of the present invention is not limited thereto. The equivalent substitutions or transformations made by a person skilled in the art on the basis of the present invention are all within the scope of protection of the present invention. The scope of protection of the present invention is subject to the claims.

The invention claimed is:

1. A mouse device, comprising:
   a touchpad configured to trigger a touch signal corresponding to a user pressing at least one of a plurality of touch regions, wherein the plurality of touch regions correspond to a plurality of input events, respectively;
   a press switch disposed on an inner side of the touchpad configured to trigger a switch signal when at least one of the plurality of touch regions is pressed by the user;
   a button cover disposed on an outer side of the touchpad configured to receive a pressing operation of pressing toward the inner side to press the touchpad, and to press the press switch through the touchpad;
   a control board electrically connected to the touchpad and the press switch, and upon receiving the touch signal and the switch signal, triggering at least one of the plurality of input events of the pressed touch region; and
   a communication circuit to send a signal to a computer device, which upon receipt, the signal causes the computer device to execute an application program installed on the computer device to:
      accept a region adjustment operation for adjusting a range of the plurality of touch regions through an operation interface; and
      set a control firmware for the mouse device on the basis of the plurality of adjusted touch regions.

2. The mouse device of claim 1, wherein the plurality of touch regions comprises a first touch region corresponding to a mouse event and a second touch region corresponding to a first button-combination event comprising the mouse event and a first button event.

3. The mouse device of claim 2, wherein the plurality of touch regions comprises a third touch region corresponding to a second button combination event comprising the mouse event and a second button event.

4. The mouse device of claim 2, wherein the first touch region is a right mouse button region or a left mouse button region, and the mouse event is a right button event or a left button event.

5. The mouse device of claim 1, further comprising a touch circuit electrically connected to the touchpad and the control board and configured to sense pressing on the plurality of touch regions and to send the touch signal to the control board.

6. The mouse device of claim 1, further comprising a side touchpad electrically connected to the control board and configured to, upon any one of a plurality of side touch regions being pressed, trigger a side touch signal of the pressed side touch region, wherein the plurality of side touch regions correspond to the plurality of input events, respectively; and
   wherein the control board is set to trigger the input event of the pressed side touch region when receiving the side touch signal.

7. The mouse device of claim 1, wherein the control board further comprises a control firmware;
   wherein the control firmware for the control board comprises instructions which, upon execution, control the control board to identify a touch region corresponding to the received touch signal, and trigger the input event of the touch region.

8. The mouse device of claim 1, wherein the plurality of touch regions are adjustable, and the control firmware defines a range of the plurality of touch regions.

9. The mouse device of claim 8, wherein the control firmware further defines boundaries of the plurality of touch regions.

10. The mouse device of claim 1, wherein the application program is further configured to:
    accept an input setting operation for setting the plurality of input events corresponding to the plurality of touch regions through the operation interface, and set the control firmware for the mouse device on the basis of the plurality of adjusted touch regions; and
transmit the control firmware to the mouse device through the computer device.

* * * * *